United States Patent
Cocchi et al.

(10) Patent No.: US 11,533,931 B2
(45) Date of Patent: Dec. 27, 2022

(54) MACHINE FOR MAKING LIQUID OR SEMI-LIQUID FOOD PRODUCTS

(71) Applicant: ALI GROUP S.R.L.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 398 days.

(21) Appl. No.: 16/785,071

(22) Filed: Feb. 7, 2020

(65) Prior Publication Data
US 2020/0253235 A1    Aug. 13, 2020

(30) Foreign Application Priority Data
Feb. 13, 2019    (IT) .......................... 102019000002111

(51) Int. Cl.
*A23G 9/16*    (2006.01)
*A23G 9/22*    (2006.01)

(52) U.S. Cl.
CPC .............. *A23G 9/166* (2013.01); *A23G 9/222* (2013.01); *A23G 9/224* (2013.01)

(58) Field of Classification Search
CPC ........ A23G 9/166; A23G 9/222; A23G 9/224; A23G 9/04; A23G 9/28; A23G 9/228; A23G 9/12; A23G 9/20; A23G 9/22; F04B 15/02; F04B 43/12; F04B 45/08; B01F 35/3204
See application file for complete search history.

(56) References Cited

U.S. PATENT DOCUMENTS

| | | | |
|---|---|---|---|
| 4,201,558 A * | 5/1980 | Schwitters | ............... A23G 9/20 141/46 |
| 5,349,825 A | 9/1994 | Duke et al. | |
| 5,447,417 A * | 9/1995 | Kuhl | ................... F04B 43/1284 417/477.11 |
| 5,646,727 A * | 7/1997 | Hammer | ............ G01N 35/1095 356/315 |

(Continued)

FOREIGN PATENT DOCUMENTS

| | | |
|---|---|---|
| EP | 0473348 A1 | 3/1992 |
| EP | 2098729 A1 | 9/2009 |
| EP | 2505070 A1 | 10/2012 |

OTHER PUBLICATIONS

Italian Search Report dated Oct. 18, 2019 for counterpart Italian Patent Application No. 102019000002111.

*Primary Examiner* — Emmanuel E Duke
(74) *Attorney, Agent, or Firm* — Shuttleworth & Ingersoll, PLC; Timothy J. Klima

(57) ABSTRACT

A machine for making liquid or semi-liquid food products, specifically ice cream, includes a vessel for processing liquid or semi-liquid base products by means of a stirring device driven by a motor. The mixture in the vessel is transferred through a duct, along which movement means for moving the mixture are operatively located, these movement means comprising a rotary device including two juxtaposed discs, on which a series of rollers is mounted in such a way as to press a flexible portion of the duct, and an opposing element confronting the rollers.

13 Claims, 3 Drawing Sheets

(56) References Cited

U.S. PATENT DOCUMENTS

| | | | |
|---|---|---|---|
| 2006/0177328 A1* | 8/2006 | Nordell | F04B 43/1253 417/477.2 |
| 2014/0061237 A1* | 3/2014 | Hayakawa | B67D 1/0028 222/129.3 |
| 2016/0113305 A1* | 4/2016 | Cocchi | A23G 9/163 426/519 |
| 2016/0249637 A1* | 9/2016 | He | A23G 9/04 62/135 |

* cited by examiner

MACHINE FOR MAKING LIQUID OR SEMI-LIQUID FOOD PRODUCTS

This application claims priority to Italian Patent Application IT102019000002111 filed Feb. 13, 2019, the entirety of which is incorporated by reference herein.

BACKGROUND OF THE INVENTION

This invention relates to a machine for processing and, when necessary, dispensing to the public, liquid or semi-liquid food products, in particular, but without thereby losing in generality, a machine for making sorbets, ice cream, soft-serve ice creams and the like.

More specifically, this invention relates to a machine for making such liquid or semi-liquid food products, in particular, ice cream or gelato creams or like products, and which is equipped with a pump that allows said products to be processed by subjecting them to a pressure higher than the pressure obtainable with machines currently in use, thus appreciably improving certain product properties.

For simplicity, reference will hereinafter be made more often to an ice cream machine which is possibly, but not necessarily, also equipped with means for subsequently dispensing the product made, without thereby limiting the scope of the invention to this specific example.

As is known, in an ice cream machine, the basic ingredients needed to make the product are placed in a mixing container and the mixture is then transferred into the processing vessel.

The processing vessel constitutes a chamber in which the product is treated and in which, for example, a stirring device is operatively located.

The mixture is transferred from the container of the base ingredients to the processing vessel using a pump mounted along the path defined by a pipe extending from the bottom of the container of the base products and leading into the processing vessel.

At the stage of batching in the processing vessel, as the mixture obtained from the base ingredients freezes, a certain amount of air (or overrun) is incorporated in the product, in order to obtain a specific ice cream product.

Balancing the amount of air incorporated in the product being made is an essential step in the production of a good artisan ice cream: indeed, the consistency, creaminess and texture, hence the overall quality, of the end product depend on this operation.

In the constructional configuration of prior art machines, overrun is incorporated almost entirely by the stirring device and, usually, the means used for moving the product do not allow reaching stable pressures sufficient to improve the overrun.

SUMMARY OF THE INVENTION

The aim of this invention therefore is to provide a machine for making liquid or semi-liquid products, in particular ice cream, sorbets, gelato creams and the like, and which is configured to incorporate air in the end product in such a way as to enhance the effect of overrun, thereby optimizing product quality.

Another aim of the invention is therefore, generally speaking, to provide a machine for making ice cream, sorbets, gelato creams and the like, where the quality of the product obtained is improved by modifying the structural configuration and efficiency of the machine itself.

According to the invention, these aims are achieved by a machine for making liquid or semi-liquid food products and comprising the technical features set out in one or more of the appended claims.

BRIEF DESCRIPTION OF THE DRAWINGS

The features of the invention, with reference to the above aims, are clearly described in the claims below and its advantages are more apparent from the detailed description which follows, with reference to the accompanying drawings which illustrate a preferred, non-limiting embodiment of the invention by way of example.

In particular.

DESCRIPTION OF THE PREFERRED EMBODIMENTS

With reference to the accompanying drawings, the numeral 1 denotes a machine used for the production of liquid or semi-liquid food products, specifically ice cream, sorbets, gelato creams and the like.

For simplicity, the description below refers only to the production of ice cream, it being understood that this shall not in any way be construed as limiting the scope of the invention.

Figure 1:
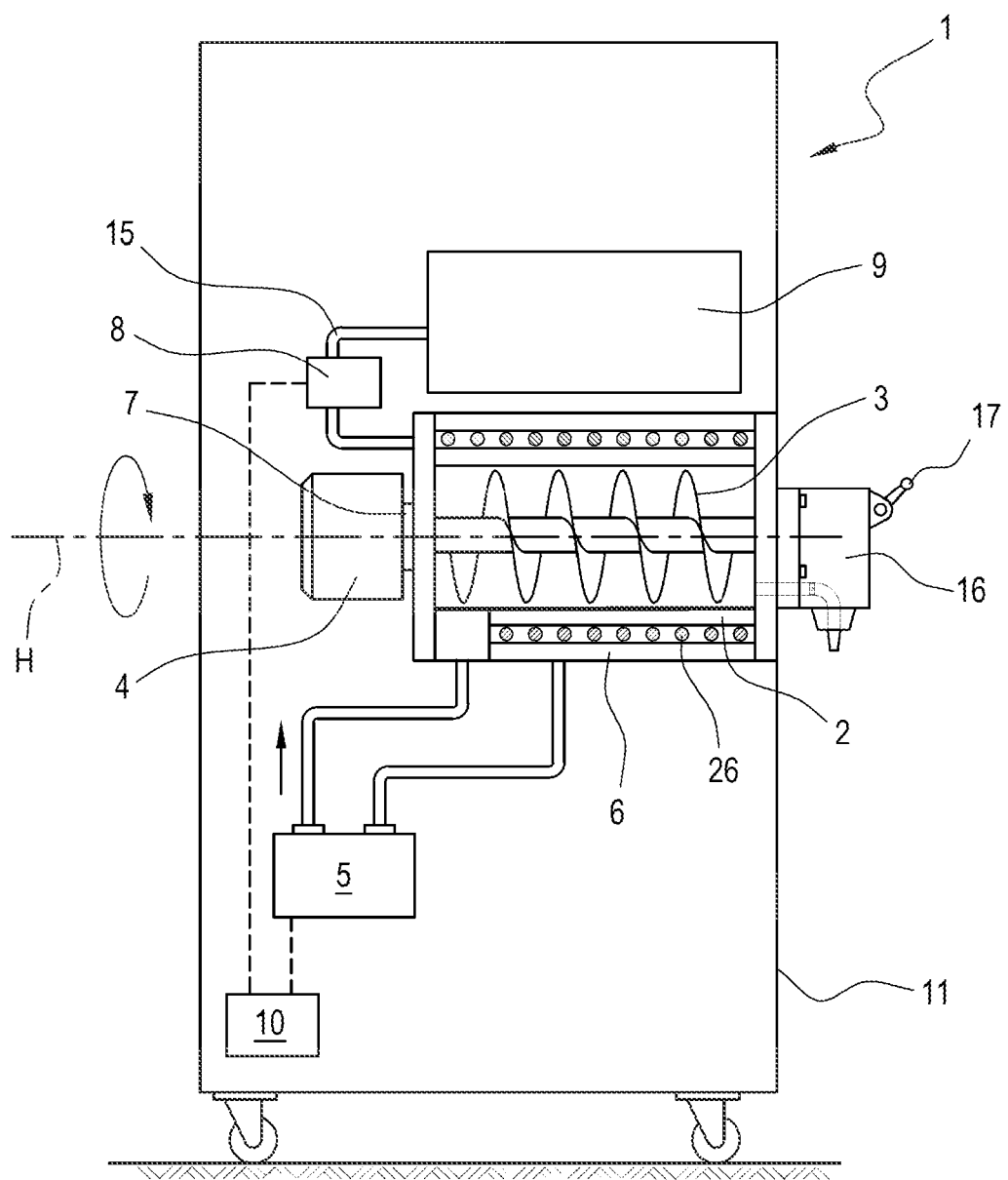
FIG. 1 schematically illustrates a machine according to this disclosure in an exemplary form for making and dispensing liquid or semi-liquid products such as ice cream.

In FIG. 1, the machine as a whole is schematically represented showing only its outer casing 11 (frame 11) and some of its basic parts, useful for understanding the invention, it being understood, however, that this illustration refers to an exemplary form and is in no way intended as limiting the scope of the invention.

In its general configuration, the machine 1 comprises a container 9 for feeding the base product.

This container is preferably a flexible container.

The base product is transferred into a vessel 2 for processing the mixture to obtain the ice cream.

Processing the liquid or semi-liquid base products inside the vessel 2 allows obtaining ice cream as the finished product.

For this purpose, the vessel 2 is internally provided with a stirring device 3 that is driven by drive means 4 for stirring the base mixture made from the liquid or semi-liquid base products.

Looking in more detail, the drive means 4 comprise an electric motor whose rotor 7 is connected directly to the stirring device 3.

Thus, the stirring device 3, which is made, for example, in the form of an endless screw, a vane, or radial scraping blades, is driven in rotation by the rotor 7.

It should be noted that the rotary shaft of the motor M and that of the stirrer 3 are preferably connected to each other and coaxial.

It is stressed, however, that a different constructional configuration is imaginable: for example, with a common rotary shaft between the stirrer 3 and the rotor 7 of the motor or with a transmission unit (gears, for example) connecting the rotary shaft of the motor with that of the stirrer 3.

Continuing with the description of the machine 1, a refrigerating system 5 is provided which is connected to a heat exchanger 6 associated with the vessel 2.

The function of the refrigerating system 5 is to chill the mixture made up of the liquid or semi-liquid base products inside the vessel 2 while simultaneously mixing it with the stirrer 3.

Preferably, the refrigerating system 5 is a thermodynamic system: that is to say, a system provided with a circuit for circulating a heat exchanger fluid and configured to perform a thermodynamic cycle on the heat exchanger fluid.

The refrigerating system 5 comprises, for example, one or more valves, a compressor which forces the refrigerant fluid to circulate in the system 5 and at least one pair of thermodynamic exchangers (one of which is the exchanger 6). These components are not illustrated in detail.

The heat exchanger 6, forming part of the system 5, may comprise a pipe 26 that is wound (in a coil) around the outside surface of the vessel 2.

The system 5 is controlled by the control unit 10 which, in particular, coordinates the operation of the drive means 4—that is, of the motor—to start it and determine its direction of rotation and different operating speeds.

To transfer the mixture, the feed container 9 is connected to the vessel 2 by a duct 15, along which a peristaltic pump 8 is operatively located to move the mixture fed into the duct 15 (arrow I, FIG. 2) in order to transfer it from the container 9 to the vessel 2.

According to the invention, the peristaltic pump 8 is located at a flexible portion 12 of the duct 15 and comprises a rotary device 13 which applies pressure on the flexible portion 12 of the duct 15.

Figure 2:
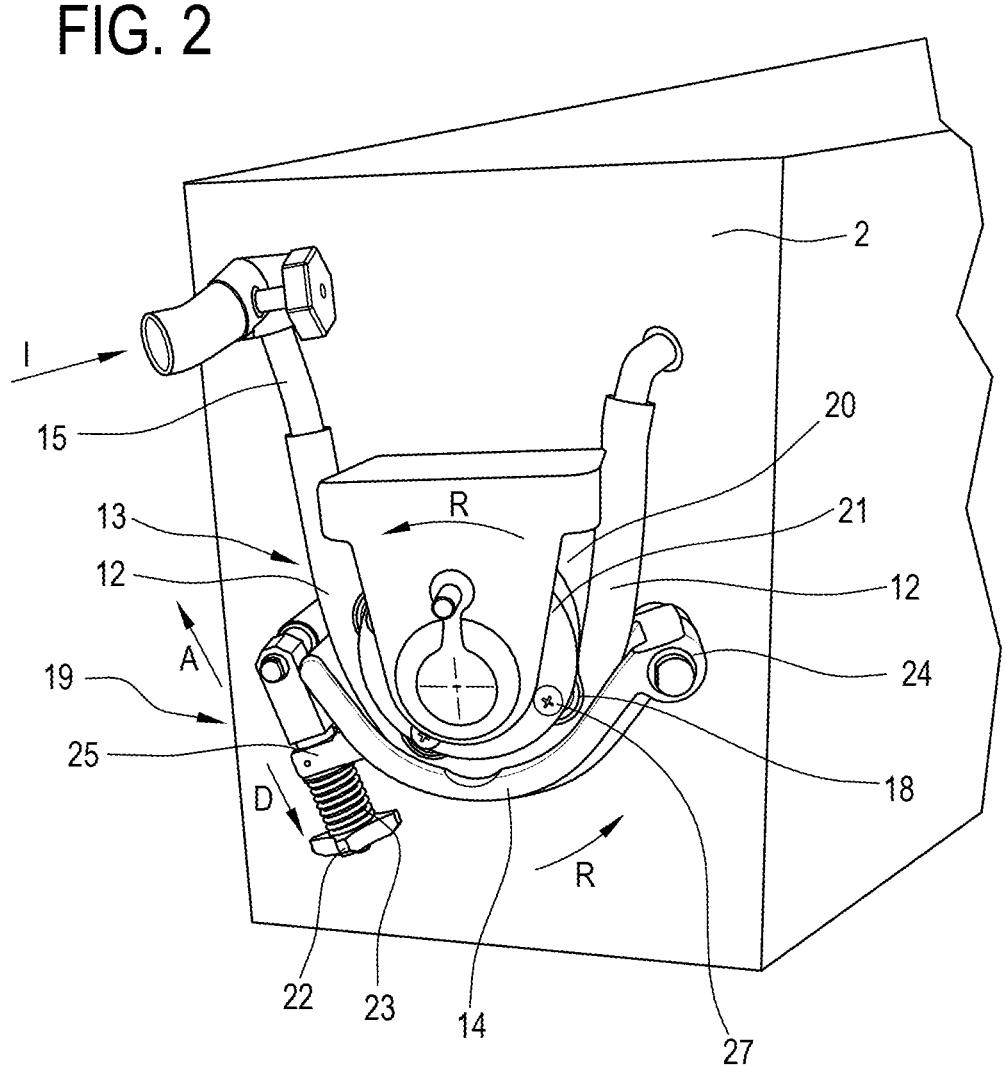
FIG. 2 schematically illustrates a detail of the machine of this invention, as illustrated in FIG. 1, according to a first embodiment.
Figure 3:
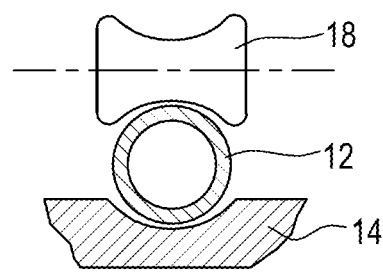
FIG. 3 is a cross section of a portion of the detail illustrated in FIG. 2.

The pressure action of the rotary device 13 is applied on the flexible portion 12 by thrust elements 18 which comprise, for example, a series of rollers 18 (as illustrated in FIG. 2).

For supporting the rollers 18, the rotary device comprises a pair of juxtaposed discs 20, 21 and the rollers 18 are rotatably mounted along the circumference of the discs 20, 21 and, more specifically, are mounted between the two discs by means of pins 27.

The discs are positioned in such a way that their rotary motion causes the rollers 18 to roll along the flexible portion 12 of the duct 15.

To allow the rollers 18 to apply pressure on the flexible portion 12, an opposing element 14 is provided.

Preferably, the opposing element 14 is mounted movably relative to the frame of the machine 1: that is to say, it can move relative to the frame 1 so as to be able to vary its position relative to the rotary device 13.

To allow applying an effective and prolonged pressure action, the opposing element 14 extends along a (circular) arc whose radius is such as to surround the discs 20, 21 at least partly, while the flexible portion 12 remains interposed between the discs (the rollers) and the arc segment 14.

That way, the rotation of the discs 20, 21 in the direction R causes the rollers 18 to squeeze the flexible portion 12, thereby pushing the mixture inside it in the direction concordant with the direction of rotation R of the discs 20, 21.

The pressure that this system can apply on the base mixture being transferred to the vessel 2 is particularly high, much higher than the pressure obtainable with the traditional devices used for transferring the mixture from the feed container 9 to the batching vessel 2.

The pressure can be as high as 4 BAR or 0.4 MPa. For example, a pressure on the mixture passing through the flexible portion (12) has a value between 0.3 and 0.4 MPa To allow easy adjustment of the pressure, the opposing element 14 is mounted rotatably (connected by a hinge) at one end 24 of it.

At its other end 25, an elastic element keeps the opposing element 14 pressed against the rotary device 13.

According to the invention, the machine 1 comprises an adjustment system 19 for adjusting the pressure with which the opposing element 14 is pressed against the rotary device 13, and thus, for providing a setting which keeps a predetermined pressure on the flexible portion 12, hence on the mixture contained therein.

It should be noted that, more generally, the adjustment system 19 comprises a movable element 30, fixed to, or integral with, the opposing element 14, and movement means 31 for moving the movable element 30 so as to adjust the position of the opposing element 14.

According to another aspect, the movement means 31 comprise guide means 32 for guiding the movable element 30 and an actuator 33 operating on the movable element 30 to impart movement thereto.

Preferably, the actuator 33 is connected to a machine control unit 10 which drives and controls the actuator 33 to adjust the position of the movable element 30.

Preferably, the actuator 33 is an electromechanical actuator.

Figure 4:
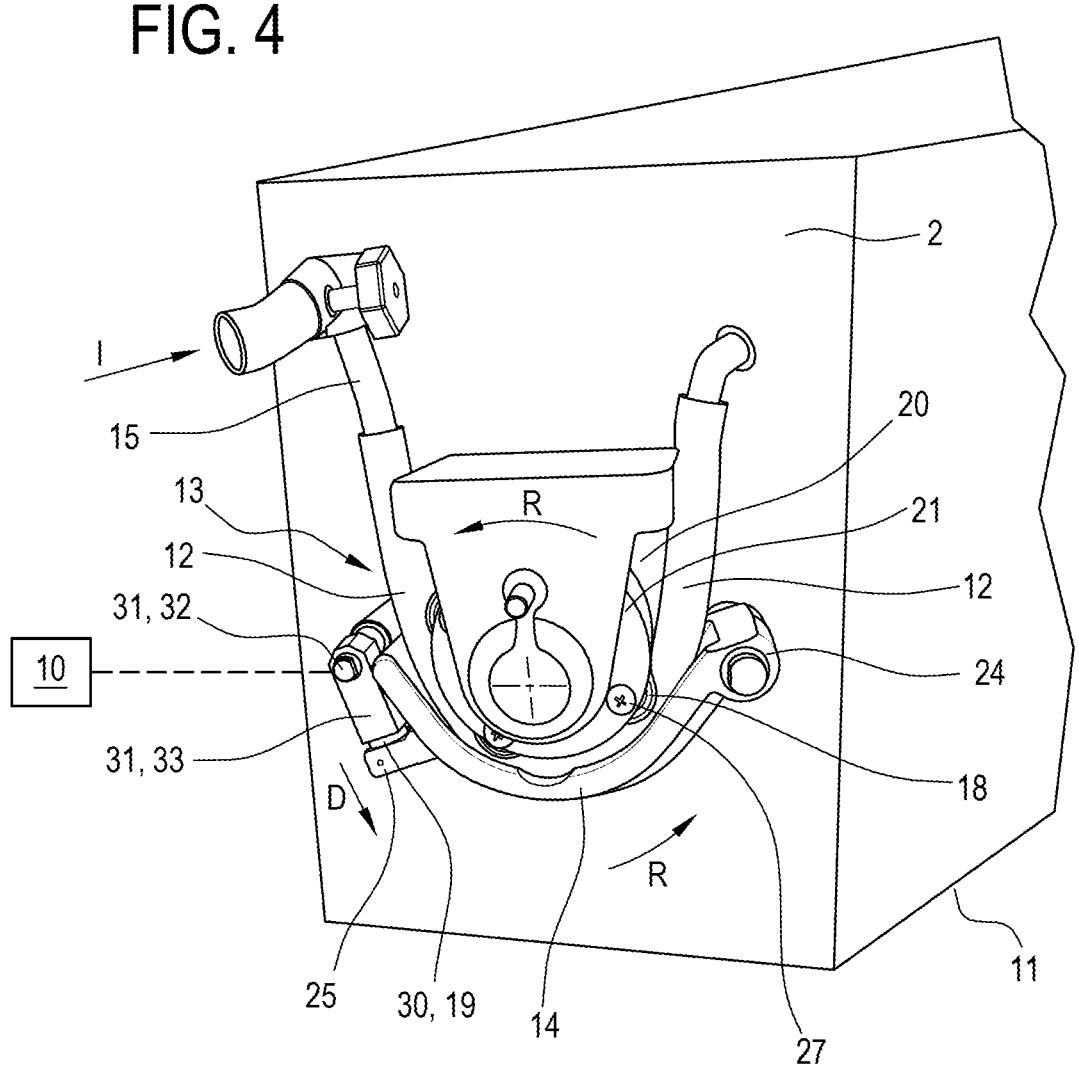
FIG. 4 schematically illustrates a detail of the machine of this invention, as illustrated in FIG. 1, according to a second embodiment.

In an embodiment, the movable element 30 and the movement means 31 for moving the movable element 30 are defined by a piston and cylinder assembly (as shown in FIG. 4).

Preferably, the piston and cylinder assembly is electronically or pneumatically actuated.

Preferably, the piston and cylinder assembly is controlled by the drive and control unit 10.

In the embodiment illustrated in FIG. 2, the adjustment system 19 is of a type operated by a screw 22 and comprises a spring 23 to adjust the pressure with which the opposing element 14 is pressed against the rotary device 13.

The elastic reaction of the spring 23 provides a setting which keeps a predetermined pressure on the flexible portion 12, hence on the mixture contained therein.

The spring 23 defines the aforementioned elastic element.

The compliance and elastic reaction of the spring 23 create a self-adjustment system that allows keeping a preset pressure on the flexible portion 12, hence on the mixture contained therein.

At the point where the vessel 2 is positioned, the casing 11 may be fitted with a dispenser 16 which allows withdrawing a measured quantity of ice cream by operating a lever 17.

Instead of the dispenser 16, a conveyor or a duct (not illustrated in the drawings) may be provided to transfer the finished product from the vessel 2 to other devices or appliances for further processing the product—for example, for packaging it.

Advantageously, the machine 1 described herein allows processing the base mixture with a higher pressure than machines provided with traditional means for moving the mixture.

That is because the pump 8 made as described herein is capable of working at higher pressures than devices traditionally used for the same purpose.

Feeding the mixture in at a higher pressure allows incorporating more air in the ice cream, thus improving overrun.

Moreover, this higher pressure can be adjusted in a wide range thanks to the adjustment system by which the opposing element 23 presses the flexible portion against the rollers 18 (mounted on the rotary discs 20, 21).

Thus, the pump 8 may be adjusted in a particularly simple and precise manner.

In the embodiment illustrated in FIG. 2, acting on the screw 22 to move the opposing element 23 in the direction indicated by the arrow A increases the pressure on the flexible portion 12 because the flexible portion is confined within a smaller space between the rollers 18 and the opposing element 14. As a result, the rollers 18 produce a higher compression pressure on the base mixture.

Instead, acting on the screw 22 to move the opposing element in the direction indicated by the arrow D decreases the pressure on the flexible portion 12 because the flexible portion 12 has more space available for it and the pressure on the mixture thus decreases.

More generally speaking, the position of the opposing element 14 can be varied by placing the opposing element 14 at any of a plurality of positions so as to be able to adjust the pushing force on the flexible portion 12 (and consequently the base product feed pressure).

All of this is reflected in the optimization of the batching cycle and in the improved quality of the finished product.

According to the instant invention, the adjustment system 19 is configured for adjusting a position of the opposing element 14 with respect to the rotary device 13, whereby a pressure, exerted by the rotary device 13 on the flexible portion 12 and on the mixture contained therein is adjustable, in use, as a function of the opposing element 14 position.

In other words, in use of the peristaltic pump 8, the exerted pressure on the flexible portion 12 can be adjusted adaptively by the movement of the opposing element 14.

The peristaltic pump 8 is situated at the flexible portion 12 of the duct and comprises the rotary device 13 which exerts a pressure on the flexible portion 12 of the duct 15 to move the product contained within the flexible portion 12. The contrast element 14 and the rotary device 13 cooperate to exert a pressure on the flexible tube 12. By modifying a position of the contrast element 14, it is possible, during use of the machine, to modify a pressure exerted by the rotary device 13 on the flexible portion 12.

What is claimed is:

1. A machine for making liquid or semi-liquid food products, comprising:
    a container adapted to contain a mixture of basic ingredients to be used for making the liquid or semi-liquid food products;
    a vessel for processing the mixture from the container to obtain finished liquid or semi-liquid products;
    a stirring device mounted inside the vessel and driven by a drive motor to stir the mixture;
    a refrigerating system comprising at least one heat exchanger thermally connected with the vessel to cool the mixture inside the vessel;
    a duct connecting the container to the vessel, the duct including a flexible portion;
    a peristaltic pump configured to move the mixture in the duct;
    a control unit adapted to control operation of the drive motor and of the peristaltic pump, the peristaltic pump being situated at the flexible portion of the duct and comprising a rotary device and an opposing element opposing the rotary device, the flexible portion being interposed between the rotary device and the opposing element so that the rotary device and the opposing element operate on the flexible portion;
    an adjustment system configured for adjusting a position of the opposing element relative to the rotary device, whereby a pressure, exerted between the rotary device and the opposing portion on the flexible portion and on the mixture contained in the flexible portion is adjustable as a function of the position of the opposing element relative to the rotary device;
    wherein the adjustment system includes a threaded fastener and a spring acted upon by the threaded fastener to adjust the pressure between the rotary device and the opposing element on the flexible portion and on the mixture contained in the flexible portion, an elastic action of the spring maintaining the pressure on the flexible portion and on the mixture contained in the flexible portion;
    wherein the adjustment system is configured such that:
        rotation of the threaded fastener in a first direction moves the opposing element and the rotary device toward one another to form a smaller space between the opposing element and the rotary device, thereby increasing the pressure on the flexible portion and on the mixture contained in the flexible portion, and
        rotation of the threaded fastener in a second direction opposite the first direction moves the opposing element and the rotary device away from one another to form a larger space between the opposing element and the rotary device, thereby decreasing the pressure on the flexible portion and the mixture contained in the flexible portion.

2. The machine according to claim 1, wherein the adjustment system further comprises a movable element, fixed to, or integral with, the opposing element, and the adjustment system moves the movable element to adjust the position of the opposing element relative to the rotary device.

3. The machine according to claim 2, wherein the adjustment system further comprises a guide surface configured for guiding the movable element and an actuator operating on the movable element to impart movement thereto.

4. The machine according to claim 3, wherein the actuator is an electromechanical actuator.

5. The machine according to claim 1, wherein the rotary device comprises a disc or two juxtaposed discs and at least one thrust element located along a circumference of the disc or discs at a position such that during rotation of the disc or discs, the at least one thrust element moves along the flexible portion of the duct, thus pushing the mixture inside the duct in a direction corresponding with a rotation direction of the disc or discs.

6. The machine according to claim 5, wherein the rotary device comprises two juxtaposed discs and wherein the at least one thrust element comprises a roller or a series of rollers rotatably supported along the circumference between the two discs.

7. The machine according to claim 6, wherein the opposing element has a cross section that is shaped to match or almost match at least part of a cross section of the flexible portion of the duct.

8. The machine according to claim 1, wherein the opposing element extends along a circular arc large enough in radius to at least partly surround the rotary device, with the flexible portion interposed between the opposing element and the rotary device.

9. The machine according to claim 1, wherein a first end of the opposing element is pivotally supported, and the elastic action is applied at a second end of the opposing element opposite the first end.

10. The machine according to claim 1, wherein the pressure on the mixture passing through the flexible portion has a value between 0.3 and 0.4 MPa.

11. The machine according to claim 1, wherein the stirring device mounted inside the vessel comprises scraper blades or an auger or a helical blade and wherein the drive motor is an electric motor controlled by the control unit.

12. The machine according to claim 1, wherein rotation of the threaded fastener in either of the first direction or the second direction continuously adjusts the pressure within a given pressure range.

13. The machine according to claim 1, wherein the adjustment system is configured to continuously adjust the pressure within a given pressure range.

\* \* \* \* \*